United States Patent [19] [11] 4,082,905
Stephan et al. [45] Apr. 4, 1978

[54] PRODUCTION OF IRON OXIDE PIGMENTS WITH IMPROVED RESISTANCE TO OXIDATION

[75] Inventors: Bernd Stephan, Bederkesa; Franz Hund; Wilhelm Holznagel, both of Krefeld, all of Germany

[73] Assignee: Bayer Aktiengesellschaft, Leverkusen, Germany

[21] Appl. No.: 797,154

[22] Filed: May 16, 1977

[30] Foreign Application Priority Data

Jun. 4, 1976 Germany ............................ 2625106

[51] Int. Cl.$^2$ ............................................... C09C 1/24
[52] U.S. Cl. .................................... 428/538; 106/304; 106/308 B; 428/539; 252/62.56; 252/62.58; 252/62.60; 252/62.62
[58] Field of Search ............... 252/62.56, 62.58, 62.60, 252/62.62; 106/304, 308 B; 428/538, 539

[56] References Cited

U.S. PATENT DOCUMENTS 3,873,461  3/1975  Mollard et al. .................. 252/62.56
3,931,025  1/1976  Woditsch et al. ................. 252/62.62

*Primary Examiner*—Winston A. Douglas
*Assistant Examiner*—J. V. Howard
*Attorney, Agent, or Firm*—Burgess, Dinklage & Sprung

[57] ABSTRACT

An $Fe_3O_4$ iron oxide black pigment having incorporated therein up to about 50 mole percent of $\gamma$-$Fe_2O_3$ plus Me $Fe_2O_4$ (wherein Me is at least one of magnesium, manganese, cobalt, nickel, aluminum, chromium, titanium, copper, zinc and cadmium) having a specific surface according to BET of greater than about 12 m$^2$/g, up to about 10% by weight of a substantially insoluble inorganic compound as coating and a stability to oxidation with air under standardized conditions of greater than about 130° C. Advantageously the coating comprises at least one of zinc hydroxide, zinc phosphate, zinc phosphite, aluminum phosphate and silica, being precipitated onto the suspended pigment from a solution. The resulting pigments are of improved resistance to oxidation, rendering them especially useful for pigmenting inorganic and organic dispersions and for use on magnetogram supports.

9 Claims, No Drawings

PRODUCTION OF IRON OXIDE PIGMENTS WITH IMPROVED RESISTANCE TO OXIDATION

It is known that iron oxide black pigments consist essentially of $Fe_3O_4$ or of mixed phases of $Fe_3O_4$ with $\gamma$-$Fe_2O_3$ (incorporating up to 50 mole percent of $\gamma$-$Fe_2O_3$) or of mixed phases of $Fe_3O_4$ with Me $Fe_2O_4$ (incorporating up to about 50 mole percent of Me $Fe_2O_4$), where Me can represent magnesium, manganese, cobalt, nickel, aluminum, chromium, titanium, copper, zinc and cadmium. By virtue of their relatively large specific surface, these iron oxide black pigments can be oxidized in the presence of oxygen or air to form pure $\gamma$-$Fe_2O_3$ or pure $\alpha$-$Fe_2O_3$ or $\gamma$-$Fe_2O_3$-rich mixed phases of $\gamma$-$Fe_2O_3$ with $Fe_3O_4$ or Me $Fe_2O_4$. This oxidation reaction begins at different temperatures, depending on particle size or specific surface and approximation to the ideal formula $Fe_3O_4$, and leads to brown or red pigments and to a change (deterioration) in magnetic properties.

Iron oxide black pigments can be obtained in known manner by precipitating iron (II)-salts with bases, accompanied by partial oxidation into iron(II)-iron(III)-compounds (German Pat. No. 891,310). Iron oxide black pigments can also be produced by precipitating iron(II) hydroxides or carbonates from iron(II)-salt solutions onto an iron oxide yellow or orange (FeOOH) produced in any way, an iron(III)/iron(II) ratio of 2:1, such as exists in magnetite, being required (German Pat. No. 900,257). Iron oxide black pigments can also be produced by reducing aromatic nitro compounds with metallic iron in an acidic suspension (German Pat. No. 463,773). Equally well known is the production of black ferrite pigments of spinel structure for magnetic recording purposes, as described for example in German Pat. No. 891,625, in German Offenlegungsschrift No. 2,162,716, in German Auslegeschrift No. 1,242,199 or in U.S. Pat. No. 2,694,656, and the use of these black ferrite pigments of spinel structure for magnetic recording purposes which may be doped with divalent elements such as magnesium, manganese, cobalt, nickel, aluminum, chromium, titanium, copper, zinc and cadmium.

The undesirable changes which iron oxide balck pigments undergo in their properties on account of their sensitivity to oxidation restrict their potential applications. The tinting strength and coercive force of iron oxide black pigments may be further increased within certain limits by reducing particle size or increasing specific surface because both tinting strength and coercive force increase with decreasing particle size within a certain particle size range. The tendency of iron oxide black pigments towards oxidation increases with increasing specific surface or with decreasing particle size and increasing $Fe^{2+}/Fe^{3+}$-ratio, so that any further increase in tinting strength and coercive force by reducing particle size and increasing the $Fe^{2+}/Fe^{3+}$ ratio is accompanied by an increase in the tendency of iron oxide black pigments towards oxidation.

Accordingly, the object of the present invention is to produce new iron oxide black pigments of high tinting strength and coercive force coupled with increased resistance to oxidation.

Accordingly, the present invention provides $Fe_3O_4$ iron oxide black pigments which may contain up to about 50 mole percent of $\gamma$-$Fe_2O_3$ and/or Me $Fe_2O_4$ (Me = magnesium, manganese, cobalt, nickel, aluminum, chromium, titanium, copper, zinc or cadmium) in incorporated form, characterized by the fact that the pigments, which have specific surfaces according to BET of greater than about 12 $m^2/g$, contain up to about 10 % by weight and preferably about 0.2 to 5% by weight of substantially insoluble inorganic compounds as coating and have a stability to oxidation with air under standardized conditions up to a temperature of greater than about 130° C, preferably greater than about 190° C and, with particular preference, greater than about 210° C.

Particularly effective, substantially insoluble, inorganic coatings in the context of the present invention are zinc hydroxide, zinc phosphate, zinc phosphite, aluminum phosphate, silica or mixtures of these compounds. In the context of this invention, the expression "zinc hydroxide" also includes basic zinc salts for example, Zn(OH)Cl.

The present invention also provides a process for the aftertreatment of $Fe_3O_4$ iron oxide black pigments which may contain up to about 50 mole percent of $\gamma$-$Fe_2O_3$ and/or Me $Fe_2O_4$ (Me = magnesium, manganese, cobalt, nickel, aluminum, chromium, titanium, copper, zinc or cadmium) in incorporated form, characterized by the fact that substantially insoluble inorganic compounds are precipitated on to pigments present in aqueous suspension in quantities of from about 0.1 to 10% by weight and preferably in quantities of about 0.2 to 5% by weight, and that the pigment provided with the precipitate is separated off from the aqueous phase and optionally washed and dried.

The coatings according to the invention may be applied to the iron oxide black pigments in different ways. In general, suitable salts are added to the suspension of iron oxide black pigments produced in the usual way and substantially insoluble deposits, such as zinc hydroxide, zinc phosphate, zinc phosphite, aluminum phosphate, silica or mixtures thereof, are precipitated on to the pigment by suitably selecting the reaction conditions. Particularly preferred deposits are zinc-containing deposits. For example, soluble zinc salts, such as zinc chloride or zinc sulfate, or aluminum salts or soluble silicates, such as waterglass solutions, may be added to the pigment suspension, and the required substantially insoluble deposits precipitated on to the pigment by substantial neutralization through the addition of acid or alkali and phosphite or phosphate ions. Acids and bases suitable for the purposes of the present invention, are, preferably, compounds such as alkali, preferably alkali metal, hydroxides or alkali carbonates, ammonia water and dilute sulfuric acid, hydrochloric acid or phosphorus acids. Precipitation may be carried out at temperatures of about 5° C to 100° C and preferably at temperatures of about 40° C to 95° C. After deposition of the inorganic substantially insoluble compounds which increase thermal stability and resistance to oxidation, the aftertreated pigment is separated from the liquid phase by filtration, optionally washed and then dried in the usual way at temperatures in the range of about 60° C to 120° C.

It has been found that, in iron oxide black pigments which have been aftertreated in accordance with the invention, oxidation begins at higher temperatures in comparison with non-aftertreated pigments and that, surprisingly, the aftertreated pigments thus aftertreated show a stronger blue tinge of the black color and higher coercive forces than untreated pigments.

The results of an aftertreatment of the kind in question can be demonstrated by a simple test under standardized conditions:

A 4 cm deep and 5 cm diameter porcelain crucible is filled with 15 g of the pigment to be tested and placed for 1 hour in a heating cabinet (volume 50 l) of the recirculating air type (rate of flow: 200 l/h) which has been preheated to a certain test temperature. Thereafter, a visual assessment is made of the color to determine whether oxidation of the iron oxide black pigment has occurred to any appreciable extent. By means of this method, it was determined that, in the presence of a coating according to the invention of 2% by weight, based on the iron oxide black pigment, the temperature at which the color of the iron oxide black pigments is distinctly changed by oxidation is displaced by up to 55° C towards higher temperatures. The effectiveness of the aftertreatment according to the invention can also be demonstrated by analysis of the iron(II)/(III) ratio: in this test, aftertreated specimens show a greater iron(II)-content than otherwise comparable iron oxide black pigments which have not been aftertreated.

The invention is illustrated by the following examples:

EXAMPLE 1

Sodium hydroxide (20%) was added to a suspension of 150 g of an iron oxide black pigment, which had been produced by the nitrobenzene reduction process with iron in acid solution in accordance with German Pat. No. 463,773 and which had a specific surface of 16 m$^2$/g, in 800 ml of water with thorough stirring (turbine impeller 400 r.p.m.) until a pH-value of 10.5 was reached. 4 ml of an aqueous waterglass solution with an SiO$_2$-content of 188 g of SiO$_2$/l and an alkali content of 63 g of Na$_2$O/l were then added to the pigment suspension at 90° C, after which the mixture was adjusted to 1112 hydroxide waterglass a pH value of 7 to 8 by the gradual addition of semiconcentrated sulfuric acid over a period of 60 minutes with through stirring (porcelain paddle stirrer at 160 r.p.m.). During hydrolysis of the waterglass, the temperature was kept between 80° C and 95° C. After the reagent had been added, the pigment sludge adjusted to a pH-value of 7 to 8 was filtered, washed with water and dried for 2 hours at 105° C. According to the so-called "thermotest" described above (for determining thermal stability), the thermal stability of the treated pigment increased by 15° C in comparison with the untreated pigment.

EXAMPLE 2

In a 90 liter vessel, 31 liters of a suspension of an Fe$_3$O$_4$-pigment of high tinting strength (the starting material of Example 1) with a solids content of 11.2 kg were adjusted to pH 10 with aqueous sodium hydroxide solution. The pigment sludge was kept at a temperature of from 90° C to 105° C by the direct introduction of steam. 600 ml of a waterglass solution (SiO$_2$-content: 370 g/l, alkali content: 123 g of Na$_2$O/l) were then added over a period of 100 minutes with stirring (paddle mixer 135 r.p.m.).

The pH-value was simultaneously lowered to 7–8 by the gradual addition of concentrated sulfuric acid. After filtration, washing with water and drying at 105° C, the product showed a thermal stability improved by 30° C in relation to an untreated comparison specimen in the thermotest described above.

EXAMPLE 3

A solution of 50 ml of soda waterglass (SiO$_2$-content: 150 g/l, Na$_2$O-content: 50 g/l) and a 15% sulfuric acid solution were simultaneously added over a period of 100 minutes with stirring (turbine impeller 500 r.p.m.) at 90° C/pH 9.5–10.5 to a suspension of a magnetite pigment of high tinting strength (specific surface 14 m$^2$/g) according to US Application Ser. No. 674,995, filed Apr. 8, 1976, now pending — produced by a precipitation process — with a solids content of 150 g of pigment in 800 ml. of water, until the pH-value changed slowly from 9.5–10.5 to pH 8. After filtration, washing with water and drying at 105° C, the pigment showed a thermal stability 40° C higher than that of an untreated specimen.

EXAMPLE 4

A suspension of 200 g of the Fe$_3$O$_4$-pigment starting material of high tinting strength of Example 1 in 500 ml of water was mixed with stirring (turbine impeller 500 r.p.m.) at room temperature and at a pH value of 3 over a period of 30 minutes with an aqueous solution of 25.1 g of ZnCl$_2$ in 70 ml. of water. The mixture was then adjusted to pH 8 with 20% sodium hydroxide over a period of 40 minutes with constant stirring, followed by stirring for another 20 minutes. The product was filtered, washed and dried at 105° C. This aftertreatment increased the thermal stability of the pigment by 40° C.

EXAMPLE 5

A suspension of 60 g of the finely divided magnetite pigment (BET surface of the dry pigment 12 m$^2$/g) starting material of Example 1, in 310 ml of water was mixed simultaneously at 90° C with 6 ml of a 0.41 molar Na$_2$HPO$_4$-solution and 6 ml of a 0.41 molar aqueous AlCl$_3$- solution by gradual dropwise addition with stirring. The pH-value was then adjusted from 3.9 to 7 by the addition over a period of 20 minutes of 20% sodium hydroxide solution. The aftertreated product was filtered, washed and dried at 105° C. The deposition of AlPO$_4$ described above had increased its stability by 15° C according to the thermotest.

EXAMPLE 6

A suspension of 100 g of a precipitated magnetite according to German Pat. No. 891,625 doped with 3 atom % of cobalt (based on the cations), which is suitable for magnetic recording and which has a specific surface of 18 m$^2$/g, in 300 ml of water was mixed while stirring at a pH-value of 3 and a temperature of 25° C with 20 ml of a 0.82 molar solution of phosphorous acid. 40 ml of a 0.615 molar zinc chloride solution were then added dropwise over a period of 10 minutes, after which the mixture was stirred for 30 minutes. The suspension was then adjusted to pH 8 by the addition over a period of 30 minutes of 40% sodium hydroxide solution. The aftertreated cobalt-containing magnetite pigment showed an increase in thermal stability of 50° C.

EXAMPLE 7

A suspension of 60 g of the finely divided iron oxide black pigment starting material of Example 1 in 400 ml of water was mixed for 15 minutes with stirring (porcelain paddle stirrer 150 r.p.m.) at room temperature with a solution of 1.74 g of ZnSO$_4$·7H$_2$O in 24 ml of water, a pH-value of 3.5–4.5 being maintained. The suspension was then adjusted to pH 8.0 by the addition over a period of 60 minutes of 0.5 N NaOH. 5 ml of a waterglass solution (SiO$_2$-content: 120 g/l, Na$_2$O-content: 40 g/l) were then added, after which the sludge, heated to 90° C, was adjusted with constant stirring to pH 7 by the addition over a period of 60 minutes of 20% sulfuric acid. The pigment was filtered, washed and dried at 105° C. Its thermal stability had increased by 20 to 30° C.

EXAMPLE 8

A suspension of 300 g of the iron oxide black pigment starting material of Example 1 with a specific surface of 14 m$^2$/g (BET-surface in 1500 ml of water was mixed while stirring at room temperature with 30 ml of a 1.64 molar aqueous solution of phosphorous acid. 60 ml of a 0.82 molar zinc chloride solution were then added over a period of 10 minutes, after which the mixture was adjusted to pH 7 by the addition over a period of 30 minutes of 2N sodium hydroxide solution. The pigment was worked up in the same way as in the preceding examples. The after treatment had increased its temperature stability by 20° C.

By virtue of their extended range of application, their improved transportability and the retention or improvement of magnetic properties, the iron oxide black pigments of spinel structure of Fe$_3$O$_4$, mixed phases of Fe$_3$O$_4$ with $\gamma$-Fe$_2$O$_3$, mixed phase of Fe$_3$O$_4$ with Me Fe$_2$O$_4$ (Me = Mg, Mn, Co, Ni, Al, Cr, Ti, Cu, Zn, Cd) thus improved in their thermal stability by the coating according to the invention represent valuable normal and magnetite pigments which may be used both for the black pigmentation of inorganic and organic dispersions and also for the magnetic recording of signals.

It will be appreciated that the instant specification and examples are set forth by way of illustration and not limitation, and that various modifications and changes may be made without departing from the spirit and scope of the present invention.

What is claimed is:

1. An Fe$_3$O$_4$ iron oxide black pigment having incorporated therein up to about 50 mole percent of $\gamma$-Fe$_2$O$_3$ plus MeFe$_2$O$_4$ (wherein Me is at least one of magnesium, manganese, cobalt, nickel, aluminum, chromium, titanium, copper, zinc and cadmium) having a specific surface according to BET of greater than about 12 m$^2$/g, up to about 10% by weight of a substantially insoluble inorganic compound as coating and a stability to oxidation with air under standardized conditions of greater than about 130° C.

2. A pigment as claimed in claim 1, wherein the coating comprises at leasst one of zinc hydroxide, zinc phosphate, zinc phosphite, aluminum phosphate and silica.

3. A pigment as claimed in claim 2, having a stability to oxidation with air greater than about 190° C, the coating being present in about 0.2 to 5% by weight.

4. A pigment as claimed in claim 2, having a stability to oxidation with air greater than about 210° C, the coating being present in about 0.2 to 5% by weight.

5. A process for the aftertreatment of an Fe$_3$O$_4$ iron oxide black pigment having incorporated therein up to about 50 mole percent of $\gamma$-Fe$_2$O$_3$ plus Me Fe$_2$O$_4$ (wherein Me is at least one of magnesium, manganese, cobalt, nickel, aluminum, chromium, titanium, copper, zinc and cadmium) which comprises forming an aqueous suspension of the pigment, dissolving an inorganic compound in the suspension, adding to the suspension a material which reacts with the inorganic compound to form an insoluble inorganic compound which precipitates onto said pigment as a coating in a quantity of from about 0.1 to 10% by weight and removing the pigment provided with the precipitated coating from the aqueous phase.

6. A process as claimed in claim 5, wherein the soluble inorganic compound is a compound of at least one of zinc, aluminum or silica and the material added to the suspension forms at least one of zinc hydroxide, zinc phosphate, zinc phosphite, aluminum phosphate and silica in about 0.2 to 5% by weight of the pigment.

7. An inorganic dispersion pigmented with a pigment according to claim 1.

8. An organic dispersion pigmented with a pigment according to claim 1.

9. A magnetogram support carrying a pigment according to claim 1.

* * * * *